G. B. Brayton,
Steam-Boiler Water-Tube.
N° 44,600.      Patented Oct. 11, 1864.
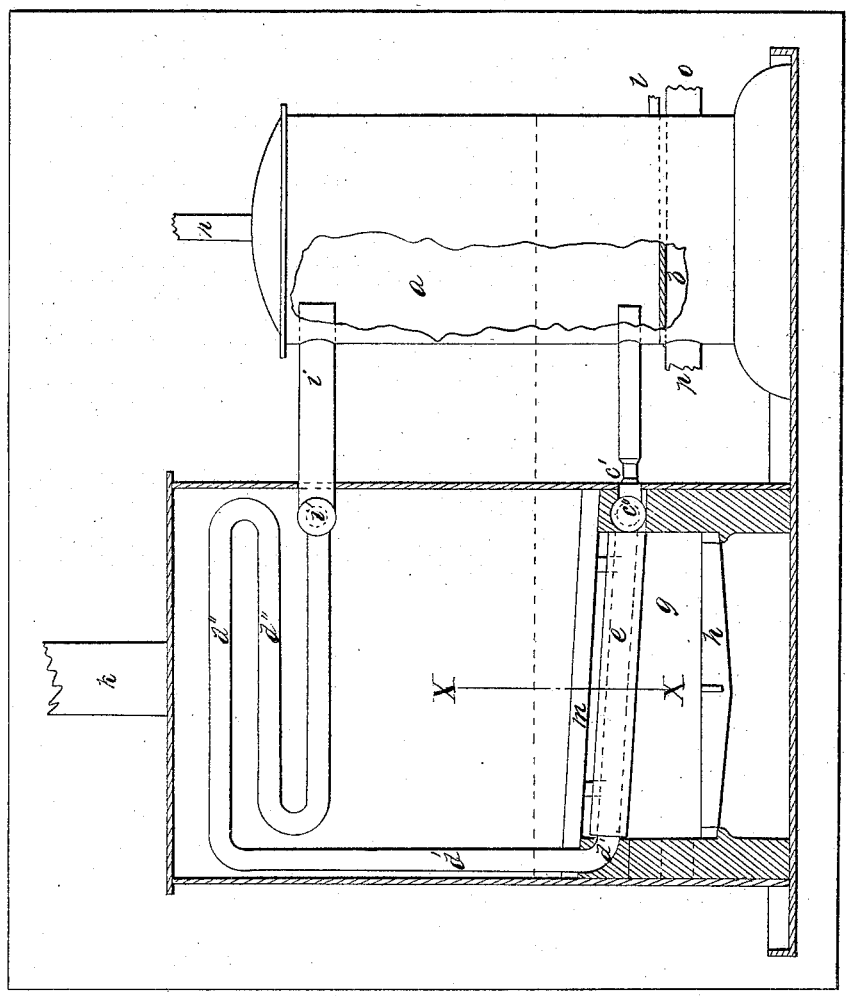
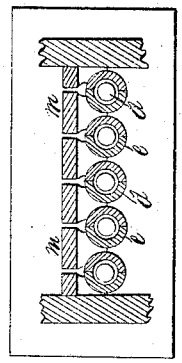
Fig. 2.
Fig. 1.
Witnesses.
A. Blake
Jos. L. Coombs
Inventor.
Geo. B. Brayton
by A. Pollok
his atty

UNITED STATES PATENT OFFICE.

GEORGE B. BRAYTON, OF PROVIDENCE, RHODE ISLAND.

IMPROVEMENT IN STEAM-GENERATORS.

Specification forming part of Letters Patent No. 44,600, dated October 11, 1864.

*To all whom it may concern:*

Be it known that I, GEORGE B. BRAYTON, of the city and county of Providence, in the State of Rhode Island, have invented certain new and useful improvements in steam-generating apparatus, which results in giving perfect safety from the dangerous and damaging effects of explosions, thus dispensing with that constant attention heretofore rendered necessary in the production of steam, economy in the consumption of fuel, and economy in construction as compared with the ordinary forms of steam-generating apparatus.

These new and valuable results are obtained through a series of inventions fully described in this and other Letters Patent granted to me and bearing even date with this, each and all of which inventions may be used independently of each other, and are therefore made the subject of separate patents. Each specification is descriptive of only so much of the accompanying drawing as is necessary to understand fully the particular improvement under discussion; but the different specifications, when taken in connection, make a complete description of the whole apparatus.

The following specification has relation to one of the improvements, and is termed a new method of controlling the supply of water to and regulating the action of the same in steam-generators of such nature in their construction that if they become highly heated from the absence of water they will still permit, without any injurious result, the sudden introduction of an amount of water a little exceeding their generating capacity under the conditions of their regular action. A generator of such nature is fully described in connection with my patent for an intercepting and transmitting medium, bearing even date with this, and consists of a series of wrought-iron tubes, a portion of which are placed in the flame of the fire.

The following is a full, clear, and exact description of this invention, reference being had to the accompanying drawing.

$a$ is a safety supplemental steam and water vessel, having a free and open communication at its top with the steam-chamber of a generator by the pipe $i$, thus permitting or insuring the same pressure in both. This vessel is fully described in my patent for the same, bearing even date with this. Water is admitted into this vessel through the pipe $l$, and maintained to any determined height by the use of a pump or other equivalent means.

$c$ is a pipe of a limited or prescribed capacity at the point $c'$, and connected at one of its ends with the vessel $a$ at a certain distance from its bottom, (in order not to interfere with the proper action of my feed-water heating apparatus, fully described in my patent for the same, bearing even date with this,) and at its other end with a steam-generator, the bottom of which is placed at a certain distance below the water-line of the vessel $a$, to allow water to flow from that vessel into the generator, and when steam is formed in the latter, this supply of water meets the demands of the generator and tends to maintain the same level in both.

In the form of generator represented in the drawing, consisting of a series of wrought-iron tubes, they receive a sufficient inclination upward from the point where water is supplied to them through the pipe $c$ to the point where they join the upright vessels to cause or permit steam, when generated, to flow in that direction.

The capacity or size of opening of the limited pipe $c'$ is to be determined by testing the evaporating-power of the generator, when filled with water to the proper height, and gaging or limiting the size of the opening so as to admit but a little more water in a given time than can be evaporated in that same time by the generator under the conditions of its regular action. Thus in case water should wholly leave the generator, from whatever cause, this supply of water, when again admitted, would soon be sufficient to meet all demands upon the generator for steam, and gradually fill it to the required height.

The object of the employment of this mode of operation or the result to be obtained from its use can be explained as follows: If by any means the generator during its operation should become highly heated from the absence of water, and then it should again commence to fill up, or the interrupted supply commence to flow in, the supply of water to and the action of the same in the generator is so regulated or limited that no explosion can take place, for from this supply of water sufficient steam is evaporated to gradually raise the pressure to the required point, while the overheated generator is reduced to its proper temperature and is filled up to the usual height, when the regular action again commences. Were a large body of water, or a quantity much exceeding the evaporating capacity of the generator under the conditions of its regular action, to be at once admitted into the highly-heated generator, an excessive quantity of steam would be instantly given off to explode the generator, which would be much weakened while thus overheated.

It will be seen from the foregoing explanation of the nature and mode of operation of my invention that I am enabled by simple and efficient means to control the supply of water to and regulate the action of the same in a steam-generator of a prescribed nature in its construction, so that while its regular action is such as to permit a body of water to be held in the generator, it wholly avoids the danger of exploding the same, if by any means it should become highly heated from the absence of water, and the interrupted supply again be allowed, or commence to flow in, and it also causes or permits a gradual filling up of the generator to the proper height and a return to its regular condition and action.

It is well known that many attempts have been made to operate steam-generators in a manner to render explosion impossible by supplying at regular intervals a specified amount of water by pressure from a pump or other equivalent means, which, falling upon the highly-heated surface of a generator, is instantly converted into steam. In such cases the amount of water thus admitted is limited to the requirements or demands made upon the generator for supplying an engine at each stroke of its piston, and the proper action of the engine is dependent upon providing the proper quantity of water. Such attempts as the above have been found to be attended with a great uncertainty of action, if not wholly impractical, from the great difficulty of properly regulating the supply of water to meet the varying demands of the engine or to give to the engine a uniform and equal motion. Another difficulty exists from the fact that a genator heated to a high temperature ts always subjected to the destroying action of the fire.

The above mentioned difficulties are overcome in my invention, as explained, and at the same time explosions are rendered impossible.

Having thus fully described my invention, I shall state my claim as follows:

In a tubular steam-generator, operating substantially as described, controlling the supply of water and regulating its action by combining, by means of a contracted tube, the said generator with a reservoir, the water in both being under like pressure, substantially as described.

GEO. B. BRAYTON.

Witnesses:
ROBERT E. NORTHAM,
A. G. UTLEY.